July 26, 1966    L. N. SCHUMAN ETAL    3,262,240

POST BASE

Filed Dec. 4, 1962

3,262,240
POST BASE
Leslie N. Schuman, Brecksville, and Howard W. Brandt, Solon, Ohio, assignors, by mesne assignments, to Midland-Ross Corporation, Cleveland, Ohio, a corporation of Ohio
Filed Dec. 4, 1962, Ser. No. 242,162
3 Claims. (Cl. 52—704)

This invention relates to posts positionable in concrete structures or the like, and more particularly to an improved base for a post adapted for use with a recessed structure.

Heretofore, safety barriers provided at the edges of bridges or other structures for the protection of vehicles or for the protection of pedestrians from highway traffic were attached to a structure, e.g., a bridge parapet, by bolts that were anchored in the concrete of the parapet. Such firmly fixed bolts were subjected, upon impact from a vehicle out of control, to various types of loads, such as bending, tensile, shear, etc. As a result, the bolts were often damaged to such an extent that replacement with new bolts was a matter of necessity. Further, rigidly attached bolts are vulnerable to shock loads and hence render the barrier less effective than desired in maintaining the vehicle on the highway.

It is therefore the primary object of this invention to provide a base for a post that avoids the use of anchor bolts fixed in the foundation material for the post.

Another object is to provide a barrier which has improved vehicle impact resistance.

A further object is to provide an improved highway and pedestrian safety barrier.

Still another object is to minimize the collision and maintenance repairs.

It is also an object to provide a base for a post that will withstand greater barrier dynamic loading.

Yet another object is to provide a base for a post that will transfer the dynamic loading directly to a foundation material through load bearing members capable of absorbing a greater dynamic load than the ordinary anchor bolt.

The above objects and others apparent hereinbelow are fulfilled in a base for a post positionable in a concrete structure or the like provided with a recess comprising a base plate or sill for supporting a vertical member, such as a guardrail post; a plurality of spaced load-bearing legs coextending from the sill in their lengthwise direction and in combination defining a wedge seat spaced from the sill; a wedge normally positioned on the wedge seat; and an adjustable member, such as one or more bolts, connecting the sill and the wedge to advance the wedge against the wedge seat and to expand the legs diagonally of the coordinate longitudinal and lateral axes of the recess to firmly engage portions of the legs with the surrounding surfaces of the recess.

In the drawings, with respect to which the invention is described below:

Figure 1:
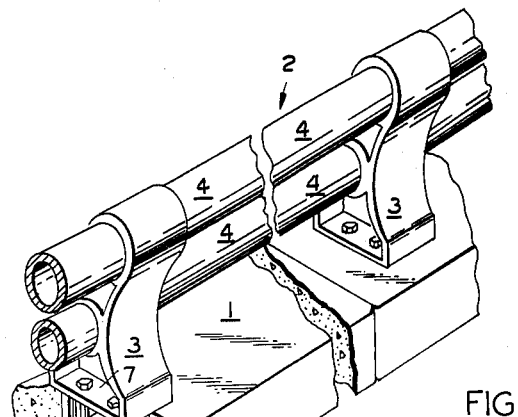
FIG. 1 is a fragmentary perspective view of a barrier affixed to a concrete structure in accordance with the invention.

Referring now to FIG. 1, a structure 1, such as a curb or parapet of concrete construction, is shown having affixed thereto a roadway barrier 2, comprising posts 3 and guardrails 4 connected thereto. The posts comprise a suitable material, such as malleable iron, steel, or aluminum. The rails 4 may vary in number or design.

The post 3 is securely mounted in an accommodating recess 5 located in the structure 1 by wedge engageable means such as legs 31 thereof depending from a base plate or sill 7, shown as an integral part of the post.

Figure 2:
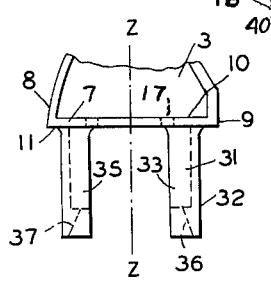
FIG. 2 is a fragmentary side elevation showing one form of base embodying the invention.
Figure 3:
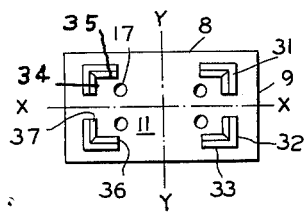
FIG. 3 is a bottom plan view of the base shown in FIG. 2.
Figure 4:
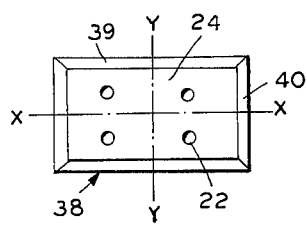
FIG. 4 is a top plan view of the wedge which will be used with the base of the form shown in FIG. 2.

FIGS. 2, 3, and 4 show one embodiment of the invention. Equidistantly spaced from the transverse axis Y—Y and extending outwardly from the undersurface 11 in a coextensive relationship and generally parallel to the vertical axis are four legs 31 joining the sill intermediately the end walls 8 and 9.

Each of the legs 31 is L-shaped in cross-section, thereby forming an angled leg in horizontal cross-section having intersecting outer peripheral surfaces 32 and 33 and inner peripheral surfaces 34 and 35, respectively. Located on the inner peripheral surfaces 34 and 35 of each leg and preferably at the lower extremity away from the sill 7 are wedge bearing areas 36 and 37. Areas 36 and 37 both slope inwardly toward the sill from the lower extremity of the leg and also intersect in a dihedral angle within the inside corner of the leg.

Bolt apertures 17 are provided to accommodate the bolts 18 normally in threaded engagement with a wedge 38 having corresponding threaded apertures 22. The wedge 38 of FIG. 4 has tapered surfaces 39 and 40 along four sides to conform to the dihedral angle formed by areas 36 and 37 on each leg 31.

The bolts 18 are turned to move the wedge toward the sill and to flex the legs into the corners and against the surrounding surfaces of the associated recess 5 to anchor the post in the structure.

Figure 5:
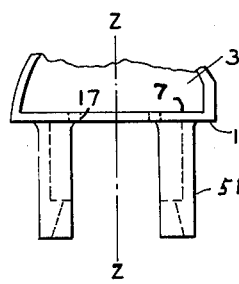
FIG. 5 is a fragmentary side elevation showing a modified form of base embodying the invention.
Figure 6:
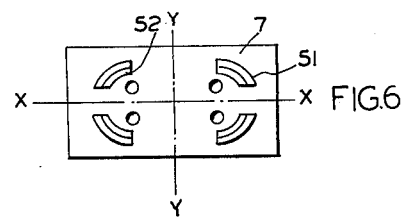
FIG. 6 is a bottom plan view of the base shown in FIG. 5.
Figure 7:
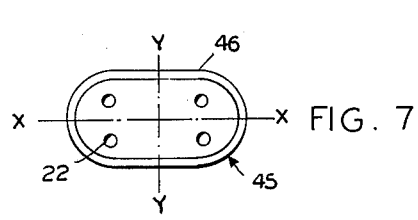
FIG. 7 is a top plan view of the wedge which will be used in conjunction with the base shown in FIG. 5.
Figure 8:
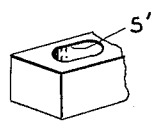
FIG. 8 is a fragmentary perspective view of the recess formed in the concrete structure for use in conjunction with the base shown in FIG. 5.

In FIGS. 5, 6 and 7 there is shown a post having concavo-convex legs 51 oppositely and equidistantly spaced from the transverse axis Y—Y. The legs 51 extend in their lengthwise direction coextensively from the sill 7 and carry at their ends opposite the sill, areas 52; forming a wedge seat for a wedge 45. The wedge 45, as shown in FIG. 7, has an encircling beveled seat 46. The bolts 18 are threadably advanced into the wedge 45 to draw it towards the sill 7. It will be seen that the wedge 45, upon tightening of the bolts 18, forces the legs 51 diagonally outward into engagement with the arcuate corner portions of the oval recess 5' (see FIG. 8) in which this embodiment of the base will be mounted.

It will be apparent that a damaged post may be readily replaced by loosening the wedge-adjusting bolts, tapping their heads to unseat the wedges, and raising the base from the recess. The simplicity of this operation minimizes the cost of replacing damaged barrier sections.

The word "oblong" as used in the appended claims to describe the recess in which the legs of the base are received is used in accordance with its strict dictionary meaning as given in Webster's New International Dictionary, Second Edition, Unabridged: "elongated, esp. as deviating from a square or circular form; . . . ."

The terms and expressions which have been employed are used as terms of description and not of limitation and there is no intention of excluding such equivalents of the invention described, or of the portions thereof, as fall within the purview of the claims.

What is claimed is:
1. A post base for use in attaching a bridge railing post to a substructure having a planar surface, said substructure including oblong recesses therein opening through said surface, said post base comprising:
 (a) a base plate adapted to overlie a recess in said substructure;
 (b) four dependent legs extending from said base and located at the corners of an imaginary rectangle inscribed therein and having its major dimension coincident with the major dimension of said recess; and
 (c) adjustable wedge means effective to urge each leg outward along a line extending outward from a central portion of said imaginary rectangle and passing through said corner.
2. The combination defined in claim 1 in which said oblong recess is rectangular in cross section and in which the legs have planar outer surfaces which intersect to form a right angle whose apex lies in a corner of the recess.
3. The combination defined in claim 1 in which said oblong recess is an oval in cross section and in which said legs have arcuate outer surfaces and each defines a portion of a different quadrant of the oval.

References Cited by the Examiner

UNITED STATES PATENTS

| | | | |
|---|---|---|---|
| 612,316 | 10/1898 | Downes | 85—74 |
| 1,179,472 | 4/1916 | Tarleton | 85—75 |
| 1,287,426 | 12/1918 | Pleister | 287—20.3 |
| 1,470,423 | 10/1923 | Brady | 85—75 |
| 2,297,139 | 9/1942 | Flachbarth | 287—20.3 X |
| 2,961,077 | 11/1960 | Chris | 189—36 |

FOREIGN PATENTS 1,294,202   4/1962   France.

FRANK L. ABBOTT, *Primary Examiner.*

RICHARD W. COOKE, JR., *Examiner.*

L. R. RADANOVIC, R. S. VERMUT,
 *Assistant Examiners.*